United States Patent
Alsalhi et al.

(10) Patent No.: US 10,879,668 B1
(45) Date of Patent: Dec. 29, 2020

(54) SOLID STATE LASER WITH CONJUGATED OLIGOMER ACTIVE MATERIAL

(71) Applicant: KING SAUD UNIVERSITY, Riyadh (SA)

(72) Inventors: Mohamad Saleh Alsalhi, Riyadh (SA); Mamduh Jamil Aljaafreh, Riyadh (SA); Saradh Prasad Rajendra, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/813,651

(22) Filed: Mar. 9, 2020

(51) Int. Cl.
*H01S 3/16* (2006.01)
*C08L 63/00* (2006.01)
*H01S 3/042* (2006.01)
*H01S 3/094* (2006.01)

(52) U.S. Cl.
CPC .............. *H01S 3/16* (2013.01); *C08L 63/00* (2013.01); *H01S 3/042* (2013.01); *H01S 3/094038* (2013.01)

(58) Field of Classification Search
CPC ...... H01S 3/16; H01S 3/042; H01S 3/094038; C08L 63/00
See application file for complete search history.

(56) References Cited

U.S. PATENT DOCUMENTS

| | | | |
|---|---|---|---|
| 3,627,601 A * | 12/1971 | Hayes | B29B 15/125 156/73.2 |
| 6,204,514 B1 | 3/2001 | Koshihara et al. | |
| 9,698,561 B1 | 7/2017 | Rajendra et al. | |
| 2004/0123895 A1* | 7/2004 | Kardauskas | H01L 31/0547 136/244 |

(Continued)

OTHER PUBLICATIONS

Pisignano et al., "Amplified spontaneous emission and efficient tunable laser emission from a substituted thiophene-based oligomer", Appl. Phys. Lett. 81, pp. 3534-3536 (2002) (Year: 2002).*

(Continued)

*Primary Examiner* — Xinning (Tom) Niu
(74) *Attorney, Agent, or Firm* — Nath, Goldberg & Meyer; Richard C. Litman

(57) ABSTRACT

The solid state laser with conjugated oligomer active material uses a lasing medium including a conjugated oligomer embedded in a transparent crystal matrix. The lasing medium preferably also includes a thermally conductive material. A pump laser generates a pump laser beam to impinge on the lasing medium, causing the lasing medium to generate at least one amplified spontaneous emission laser beam. The transparent crystal matrix may be formed from an epoxy thermosetting plastic, such as that formed from a hardener and an epoxy, such as isobornyl acrylate, ethyl 2-cyanoacrylate, ethyl 2-cyano-3,3-bis(methylthio)acrylate, ethyl cyanoacrylate, ethyl cis-(β-cyano)acrylate, poly(bisphenol A-co-epichlorohydrin) or bisphenol A. The conjugated oligomer may be 1,4-bis(9-ethyl-3-carbazo-vinylene)-9,9-dihexyl-fluorene (BECVH-DHF). The thermally conductive material may be molybdenum disulfide ($MoS_2$) or [6,6]-phenyl-C61-butyric acid methyl ester (PCBM 60).

9 Claims, 8 Drawing Sheets

(56) References Cited

U.S. PATENT DOCUMENTS

2009/0316429 A1* 12/2009 Ramuz ............... G01N 21/7703
                                                                362/558

OTHER PUBLICATIONS

Alsalhi et al., "A Temperature-Tunable Thiophene Polymer Laser," Polymers, Apr. 25, 2018; 10(5): 470.
Aljaafreh et al., "Ultrafast dynamics of Laser from Green Conjugated-Oligomer in solution," Polymer, vol. 169, Apr. 15, 2019, pp. 106-114.
Aljaafreh et al., "Optically Pumped Intensive Light Amplification from a Blue Oligomer," Polymers, Sep. 20, 2019; 11(10).

* cited by examiner

SOLID STATE LASER WITH CONJUGATED OLIGOMER ACTIVE MATERIAL

BACKGROUND

1. Field

The disclosure of the present patent application relates to solid state lasers, and particularly to a solid state laser using a conjugated oligomer as the active material or active lasing medium.

2. Description of the Related Art

There is a great deal of interest in optically-pumped tunable lasers, since such lasers have an extensive range of applications, from industrial processes to medical applications. However, optically-pumped tunable solid state lasers, such as Ti:sapphire and forsterite lasers, although presently commercially available, are both expensive and have limited tunability. At present, research is directed towards dye lasers, which use such dyes as rhodamine and coumarin derivatives as a lasing medium, since such dye-based laser media have an excellent capacity for tunability. However, such dyes have numerous shortcomings related to their photochemical stability.

Present solid state lasers, such as fiber lasers, fiber Raman lasers, and cascaded or array diode lasers, have minimal power capacities, limited tunability and are very expensive. Conjugated polymers are promising for replacing both dye-based laser media and solid state laser media, as they tend to be photochemically stable and relatively easy to synthesize. However, common conjugated polymers have quantum yields of only 50% and do not dissolve in most common solvents, such as acetone.

The oligomer is a particular class of materials that possesses many of the advantages of both conventional dye laser and conjugate polymer laser materials. The conjugated oligomer combines the advantages of conventional dye lasers and the superior photochemical stability of the conjugated polymer, due to the relatively few repetitive monomers in the oligomer. Further, conjugated oligomers have the capacity for self-assembly, which makes them ideal for organic optoelectronic devices and components. It would be desirable to be able to use conjugated oligomers as the active lasing material in a solid state laser. Thus, a solid state laser with conjugated oligomer active material solving the aforementioned problems is desired.

SUMMARY

The solid state laser with a conjugated oligomer active material uses a lasing medium formed from a conjugated oligomer embedded in a transparent crystal matrix. Preferably, the lasing medium also includes a thermally conductive material embedded in the crystal matrix. A pump laser generates a pump laser beam to impinge on the lasing medium, causing the lasing medium to generate at least one amplified spontaneous emission laser beam. The transparent crystal matrix may be formed from an epoxy thermosetting plastic. For example, the epoxy thermosetting plastic may be formed from a hardener and an epoxy, such as isobornyl acrylate, ethyl 2-cyanoacrylate, ethyl 2-cyano-3,3-bis(methylthio)acrylate, ethyl cyanoacrylate, ethyl cis-(β-cyano) acrylate, poly(bisphenol A-co-epichlorohydrin) or bisphenol A. Alternatively, the transparent crystal matrix may be formed from a thermoplastic matrix, such as, for example, a matrix formed from ethylene-vinyl acetate (EVA), polyethylene (which may be recycled), polybutene-1, polymethylpentene, or polypropylene. The conjugated oligomer may be 1,4-bis(9-ethyl-3-carbazo-vinylene)-9,9-dihexyl-fluorene (BECVH-DHF), for example. The thermally conductive material may be molybdenum disulfide ($MoS_2$) or [6,6]-phenyl-C61-butyric acid methyl ester (PCBM 60), for example.

The lasing medium may generate first and second amplified spontaneous emission laser beams. The solid state laser may be used in this configuration or, alternatively, a mirror may be used to reflect the first amplified spontaneous emission laser beam back into the lasing medium. Alternatively, both a fully reflective mirror and a partially reflective mirror may be used to define a laser cavity around the lasing medium. In this alternative, the pump laser beam generates first and second amplified beams in the lasing medium, and the fully reflective mirror reflects the first amplified beam back into the lasing medium. The partially reflective mirror partially reflects the second amplified beam back into the lasing medium, and the remaining portion of the second amplified beam is transmitted through the partially reflective mirror as the resultant solid state laser beam.

As a further alternative, the lasing medium in the form of the conjugated oligomer and the thermally conductive material embedded in the transparent crystal matrix, may be replaced by a thin film of the conjugated oligomer on a transparent substrate. The conjugated oligomer and the thermally conductive material may be coated as a thin film on the transparent substrate by spin coating or the like. The transparent substrate may be, for example, glass, quartz or transparent plastic.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
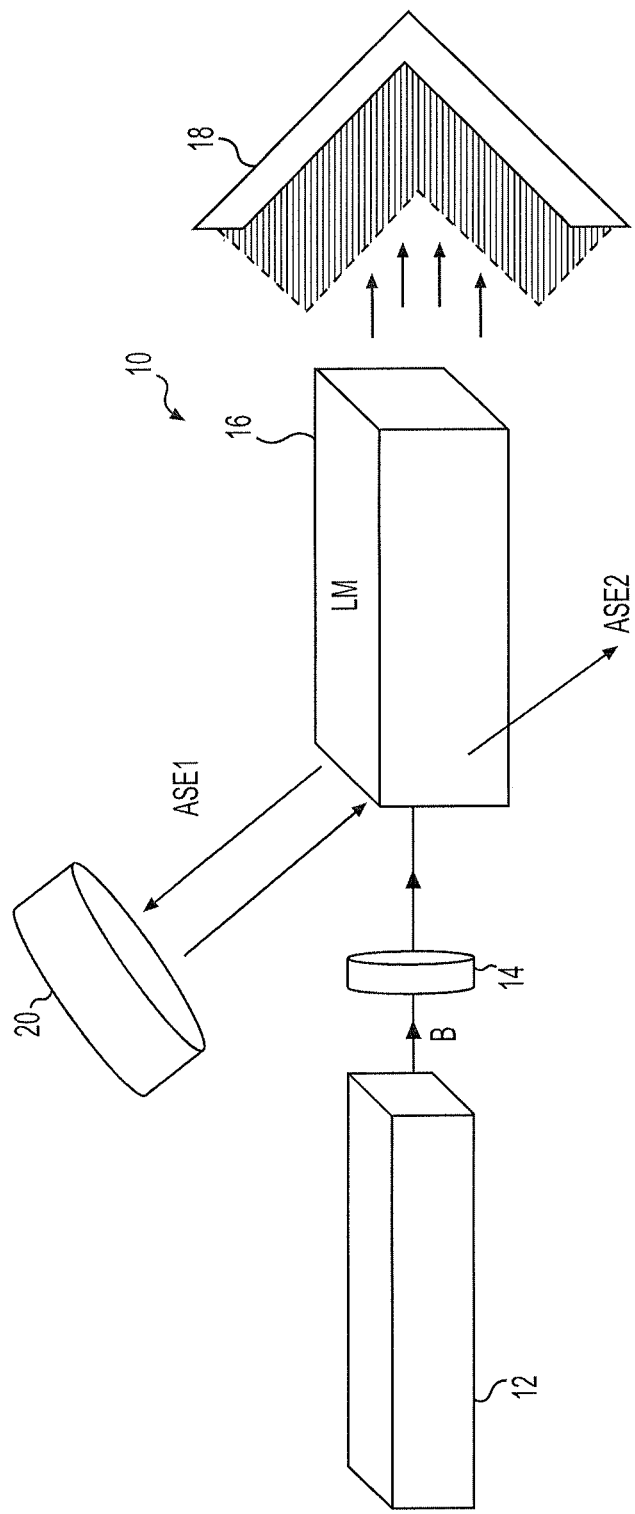
FIG. 1 is a schematic diagram of a solid state laser with conjugated oligomer active material.

The solid state laser with conjugated oligomer active material 10 uses a lasing medium (LM) 16 formed from a conjugated oligomer embedded in a transparent crystal matrix. Preferably, the lasing medium also includes a thermally conductive material embedded in the crystal matrix. As shown in FIG. 1, a pump laser 12 generates a pump laser beam B to impinge on the lasing medium 16, causing the lasing medium 16 to generate at least one amplified spontaneous emission laser beam (beams ASE1 and ASE2 in FIG. 1). It should be understood that pump laser 12 may be any suitable type of pump laser used for excitation on solid state lasers, such as a Nd-YAG laser operating at 355 nm or a diode laser operating at 405 nm. It should be further understood that the pump laser beam B may be focused on the lasing medium 16 using any suitable type of focusing optics, such as one or more lenses 14. As shown in FIG. 1, any residual light generated by the pump laser 12 may be attenuated using a conventional beam stop 18 or the like.

The transparent crystal matrix of lasing medium 16 may be formed from an epoxy thermosetting plastic. For example, the epoxy thermosetting plastic may be formed from a hardener and an epoxy, such as isobornyl acrylate, ethyl 2-cyanoacrylate, ethyl 2-cyano-3,3-bis(methylthio) acrylate, ethyl cyanoacrylate, ethyl cis-(β-cyano)acrylate, poly(bisphenol A-co-epichlorohydrin) or bisphenol A. Alternatively, the transparent crystal matrix may be formed from a thermoplastic matrix, for example, a matrix formed from ethylene-vinyl acetate (EVA), polyethylene (which may be recycled), polybutene-1, polymethylpentene, or polypropylene. The conjugated oligomer may be 1,4-bis(9-ethyl-3-carbazo-vinylene)-9,9-dihexyl-fluorene (BECVH-DHF), for example. The thermally conductive material may be molybdenum disulfide ($MoS_2$) or [6,6]-phenyl-C61-butyric acid methyl ester (PCBM 60), for example. The $MoS_2$ may be in the form of nano-flakes.

The lasing medium 16 may generate first and second amplified spontaneous emission laser beams ASE1, ASE2. The solid state laser 10 may be used in this configuration, or alternatively, as shown in FIG. 1, a mirror 20 may be used to reflect the first amplified spontaneous emission laser beam ASE1 back into the lasing medium 16. It should be understood that any suitable type of mirror or reflector may be used. It should be understood that FIG. 1 diagrammatically illustrates lasing medium 16 for illustrative purposes only. In practice, the lasing medium 16 may be disposed within any suitable type of container or support, as is well known in the field of solid state laser construction. Further, it should be understood that the lasing medium 16 may be provided in any suitable configuration, such as in the form of rods, flat slabs, rectangular bars or the like.

Figure 2:
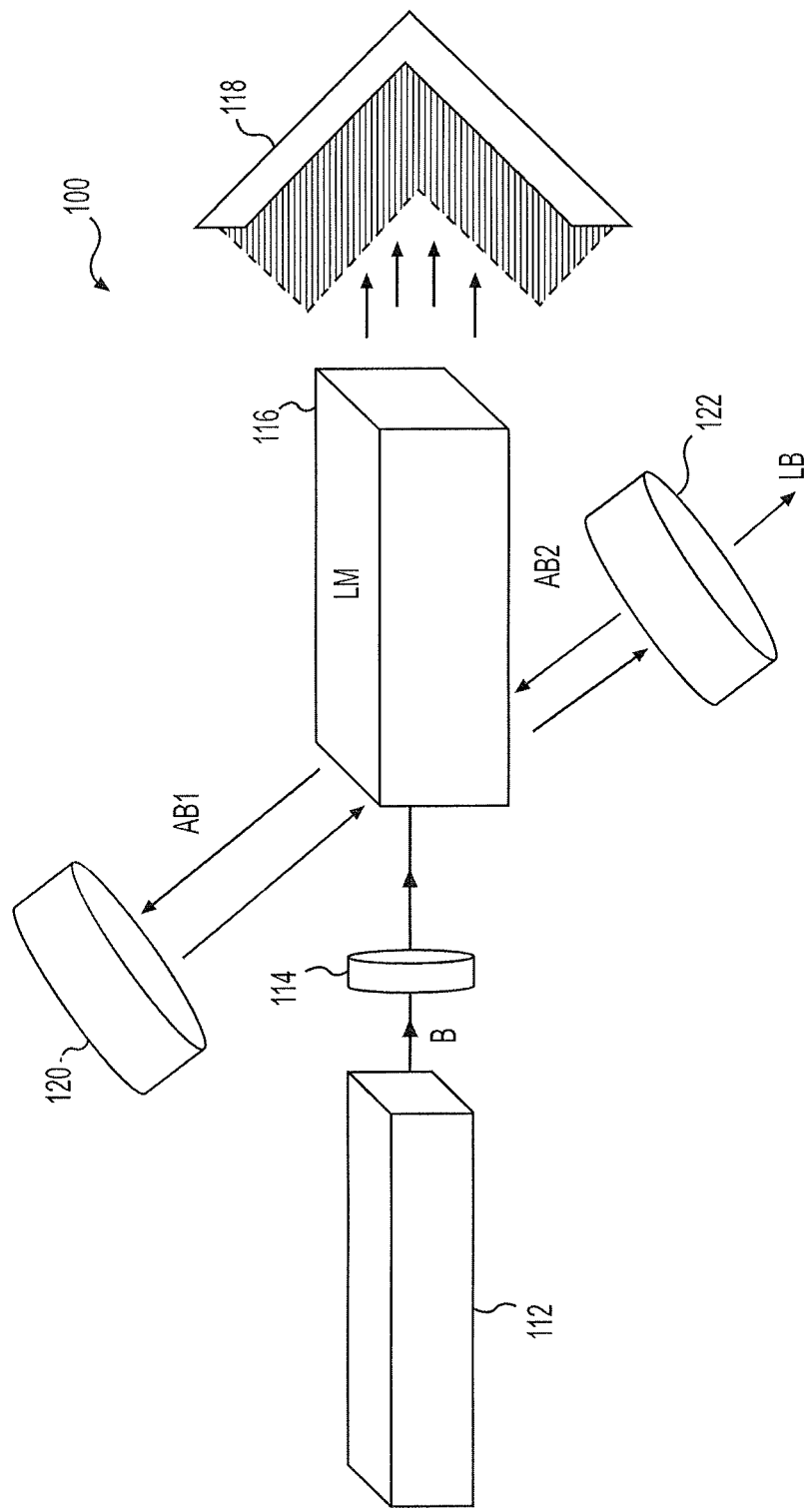
FIG. 2 is a schematic diagram of an alternative embodiment of a solid state laser with conjugated oligomer active material.

In the alternative embodiment of FIG. 2, the solid state laser with conjugated oligomer active material 100 includes both a fully reflective mirror 120 and a partially reflective mirror 122 to define a laser cavity around the lasing medium 116. In this embodiment, a pump laser 112, which is similar to pump laser 12, generates a pump laser beam B, which may be focused through one or more lenses 114 or the like to generate first and second amplified beams AB1 and AB2 in the lasing medium 116. The fully reflective mirror 120 reflects the first amplified beam AB1 back into the lasing medium 116. The partially reflective mirror 122 partially reflects the second amplified beam AB2 back into the lasing medium 116, and the remaining portion of the second amplified beam AB2 is transmitted through the partially reflective mirror 122 as the resultant solid state laser beam LB. The partially reflective mirror 122 may have a reflectivity ranging between approximately 60% and approximately 90%.

Figure 3:
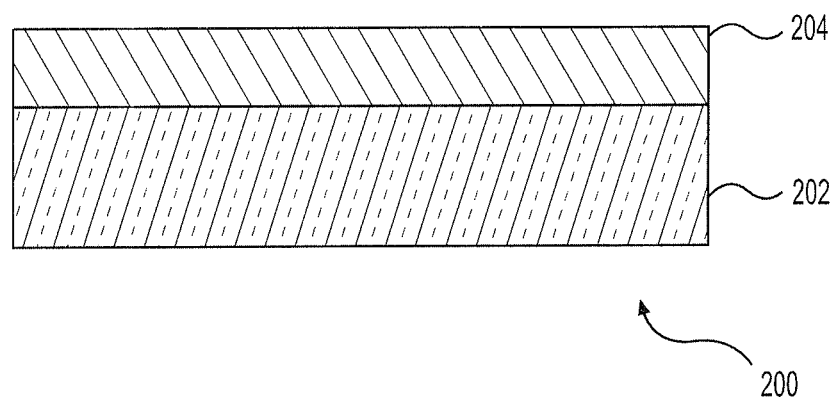
FIG. 3 is a side view in section of an alternative lasing medium for a solid state laser with conjugated oligomer active material.

As a further alternative, the lasing medium in the form of the conjugated oligomer (preferably combined with the thermally conductive material) embedded in the transparent crystal matrix, as in the previous embodiments, may be replaced by lasing medium 200, as shown in FIG. 3, which is formed as a thin film of the conjugated oligomer 204 on a transparent substrate 202. The conjugated oligomer and the thermally conductive material may be coated as a thin film 204 on the transparent substrate 202 by spin coating or the like. The transparent substrate 202 may be, for example, glass, quartz or transparent plastic.

Example 1

Conjugated Oligomer in 2-Component Epoxy; No Thermally Conductive Material

For purposes of comparison, Example 1 was prepared without a thermally conductive material. BECVH-DHF was dissolved in toluene (or other suitable solvents) to form solutions having different concentrations. For example, 4 mg of BECVH-DHF was dissolved in 2 ml of toluene. This solution was mixed with the epoxy and heated at 80° C. to reduce the solvent. The sample was sonicated for 30 minutes to remove air bubbles and trapped solvent. This step also increased the transparency of the sample. The hardener was added, such that the ratio of epoxy to hardener was 3:1, forming a transparent viscous liquid. The viscous liquid was sonicated for 20 minutes to remove air bubbles. The viscous liquid was then transferred to silicon molds (or quartz containers) of differing shapes, and left for 24 hours at room temperature and ambient atmosphere, or at 40° C. in a nitrogen atmosphere. The solid lasing medium was then removed from the silicon molds (or quartz containers).

Figure 4:
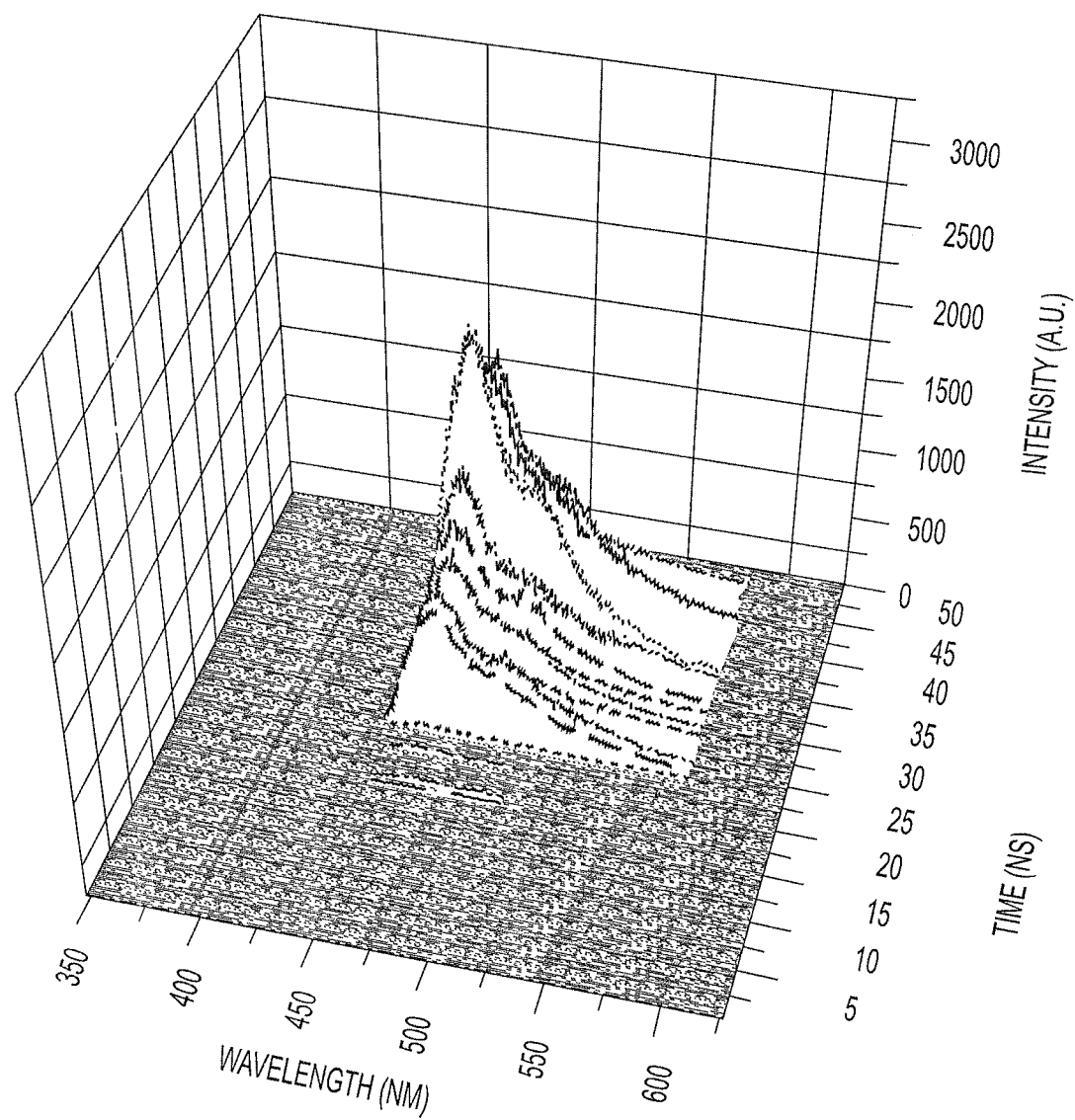
FIG. 4 is a plot of time resolved spectroscopy (TRS) results of laser induced fluorescence (LIF) of a lasing medium used in the solid state laser with conjugated oligomer active material of FIG. 1, operating in a mirrorless mode with a pump energy of 2 mJ, the lasing medium including the conjugated oligomer embedded in a two-component epoxy resin matrix, but omitting the thermally conductive material.

FIG. 4 illustrates the time resolved spectroscopy (TRS) results of laser induced fluorescence (LIF) of the lasing medium of Example 1 in the solid state laser setup of FIG. 1, but without mirror 20 (i.e., in a mirrorless mode). FIG. 4 shows the time evolution of LIF produced by the solid state laser 10 using the lasing medium of Example 1 (in mirrorless mode), with a pump energy (from pump laser 12) of 2 mJ. LIF was produced with a full width half maximum (FWHM) of 50 nm.

Figure 5:
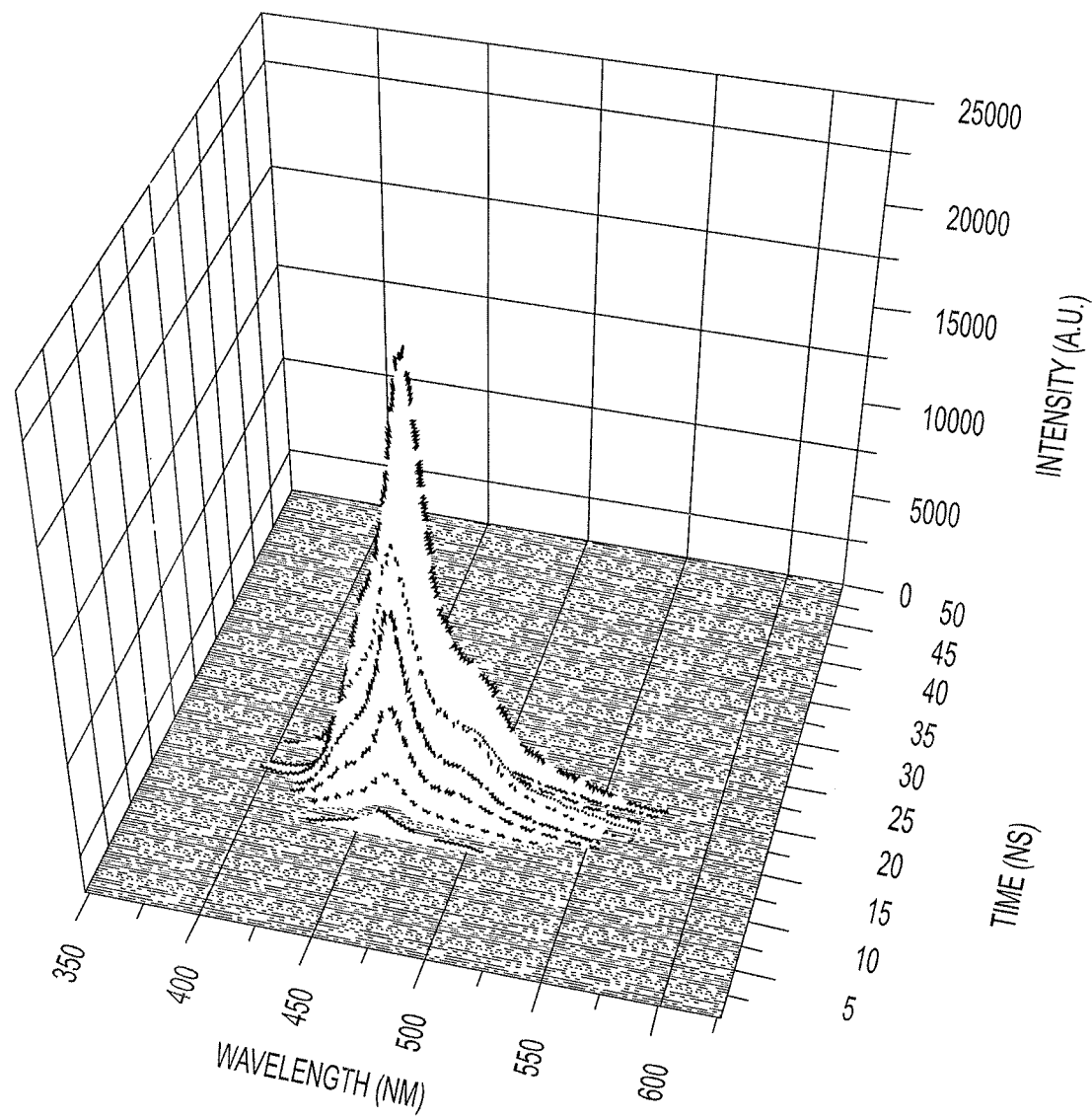
FIG. 5 is a plot of TRS results of laser threshold (LT) of the lasing medium used in the solid state laser with conjugated oligomer active material of FIG. 1, operating in the mirrorless mode with a pump energy of 2.5 mJ, the lasing medium including the conjugated oligomer embedded in a two-component epoxy resin matrix, but omitting the thermally conductive material.

FIG. 5 shows the TRS of the laser threshold (LT) of the lasing medium of Example 1 when the pump energy was increased to 2.5 mJ. At this energy level, the lasing medium produced threshold amplified spontaneous emission (ASE). The FWHM is only 7 nm for the peak. However, the peak stands on the top of the LIF, which has a FWHM of 30 nm. Similar results were obtained for the lasing mediums of Examples 2 and 3, as described below. Example 2, as will be described below, includes the addition of $MoS_2$ as a thermally conductive material, and this increased performance three-fold, from 4,000 pulses at a single point to 12,000 pulses.

Figure 6:
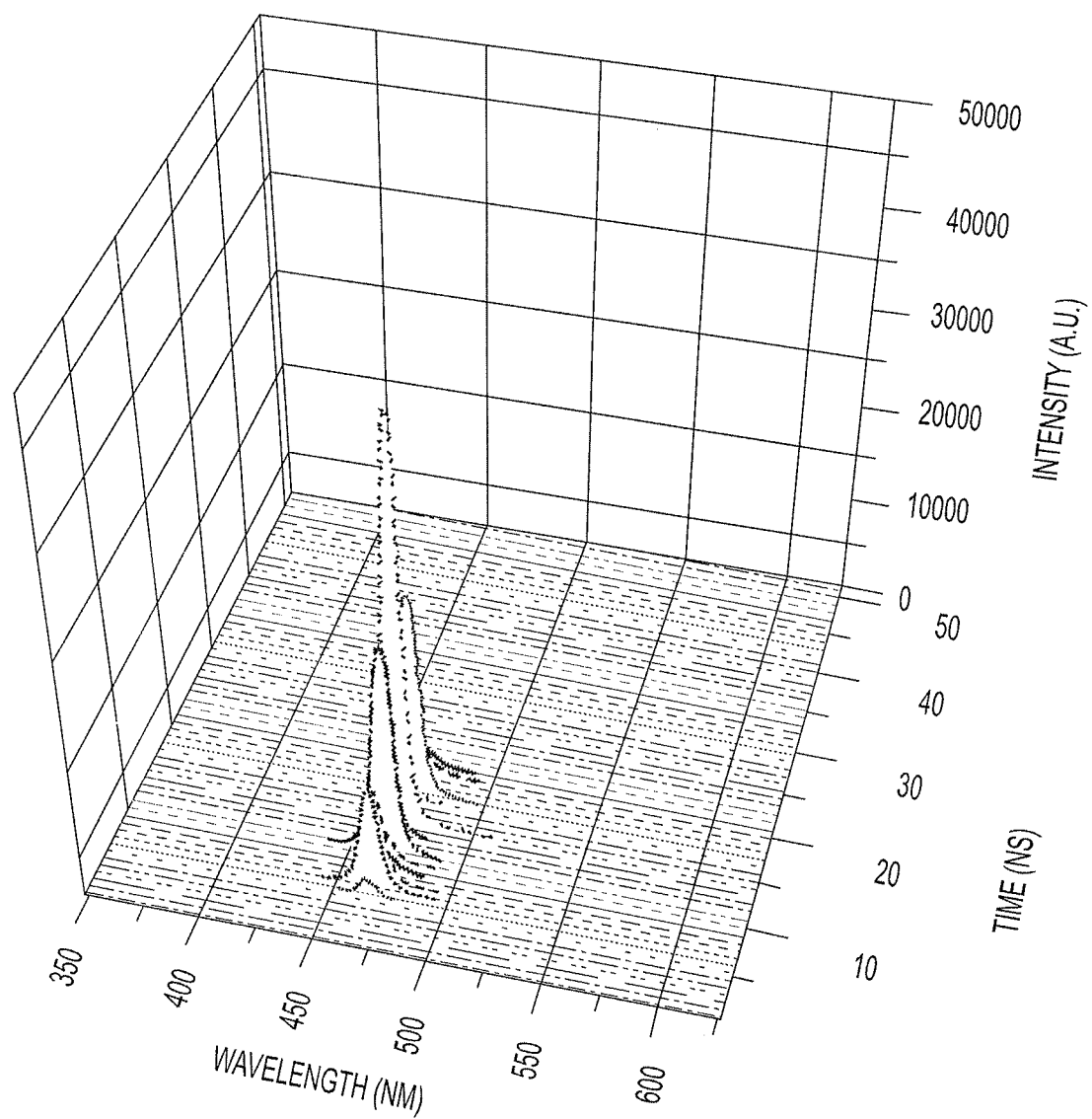
FIG. 6 is a plot of TRS results of amplified spontaneous emission (ASE) of the lasing medium used in the solid state laser with conjugated oligomer active material of FIG. 1, operating in the mirrorless mode, the lasing medium including the conjugated oligomer embedded in a two-component epoxy resin matrix, but omitting the thermally conductive material.

FIG. 6 shows the TRS of amplified spontaneous emission (ASE) of the lasing medium of Example 1, also in the mirrorless mode for laser 10 of FIG. 1. Here, the FWHM is 4 nm. Similar action was found for Examples 2 and 3, as will be described below, and each of Examples 1, 2 and 3 showed improved efficiency and lifetime.

Example 2

Conjugated Oligomer with $MoS_2$ in 2-Component Epoxy

BECVH-DHF was dissolved in toluene (or other suitable solvents) to form solutions having different concentrations. For example, 4 mg of BECVH-DHF was dissolved in 2 ml of toluene. Between 5% and 15% of exfoliated $MoS_2$ single layer flakes was dispersed in the solution. This solution was mixed with the epoxy and heated at 80° C. to reduce the solvent. The sample was sonicated for 30 minutes to remove air bubbles and trapped solvent. This step also increased the transparency of the sample. The hardener was added, such that the ratio of epoxy to hardener was 3:1, forming a transparent viscous liquid. The viscous liquid was sonicated for 20 minutes to remove air bubbles. The viscous liquid was then transferred to silicon molds (or quartz containers) of differing shapes, and left for 24 hours at room temperature. The solid lasing medium was then removed from the silicon molds (or quartz containers).

Example 3

Conjugated Oligomer with PCBM in 2-Component Epoxy

BECVH-DHF was dissolved in toluene (or other suitable solvents) to form solutions having different concentrations. For example, 4 mg of BECVH-DHF was dissolved in 2 ml of toluene. Between 5% and 15% of single layer PCBM 60 was dispersed in the solution. This solution was mixed with the epoxy and heated at 80° C. to reduce the solvent. The sample was sonicated for 30 minutes to remove air bubbles and trapped solvent. This step also increased the transparency of the sample. The hardener was added, such that the ratio of epoxy to hardener was 3:1, forming a transparent viscous liquid. The viscous liquid was sonicated for 20 minutes to remove air bubbles. The viscous liquid was then transferred to silicon molds (or quartz containers) of differing shapes, and left for 24 hours at room temperature. The solid lasing medium was then removed from the silicon molds (or quartz containers).

Example 4

Conjugated Oligomer in EVA Matrix; No Thermally Conductive Material

For purposes of comparison, Example 4 was prepared without a thermally conductive material. BECVH-DHF was dissolved in toluene (or other suitable solvents) to form solutions having different concentrations. For example, 4 mg of BECVH-DHF was dissolved in 2 ml of toluene. Ethylene-vinyl acetate (EVA) beads were dissolved homogeneously in the same solvent to form a second solution. Alternatively, glue sticks were melted with a glue gun and the hot melt was added directly to the solvent. The BECVH-DHF solution was added to the EVA solution and maintained at 100° C. under stirring and sonication for three hours. A viscous liquid formed, and this was further sonicated without stirring for 20 minutes to remove air bubbles. The viscous liquid was then transferred to silicon molds (or quartz containers) of differing shapes, and left for 24 hours at room temperature. The solid lasing medium was then removed from the silicon molds (or quartz containers).

Figure 7:
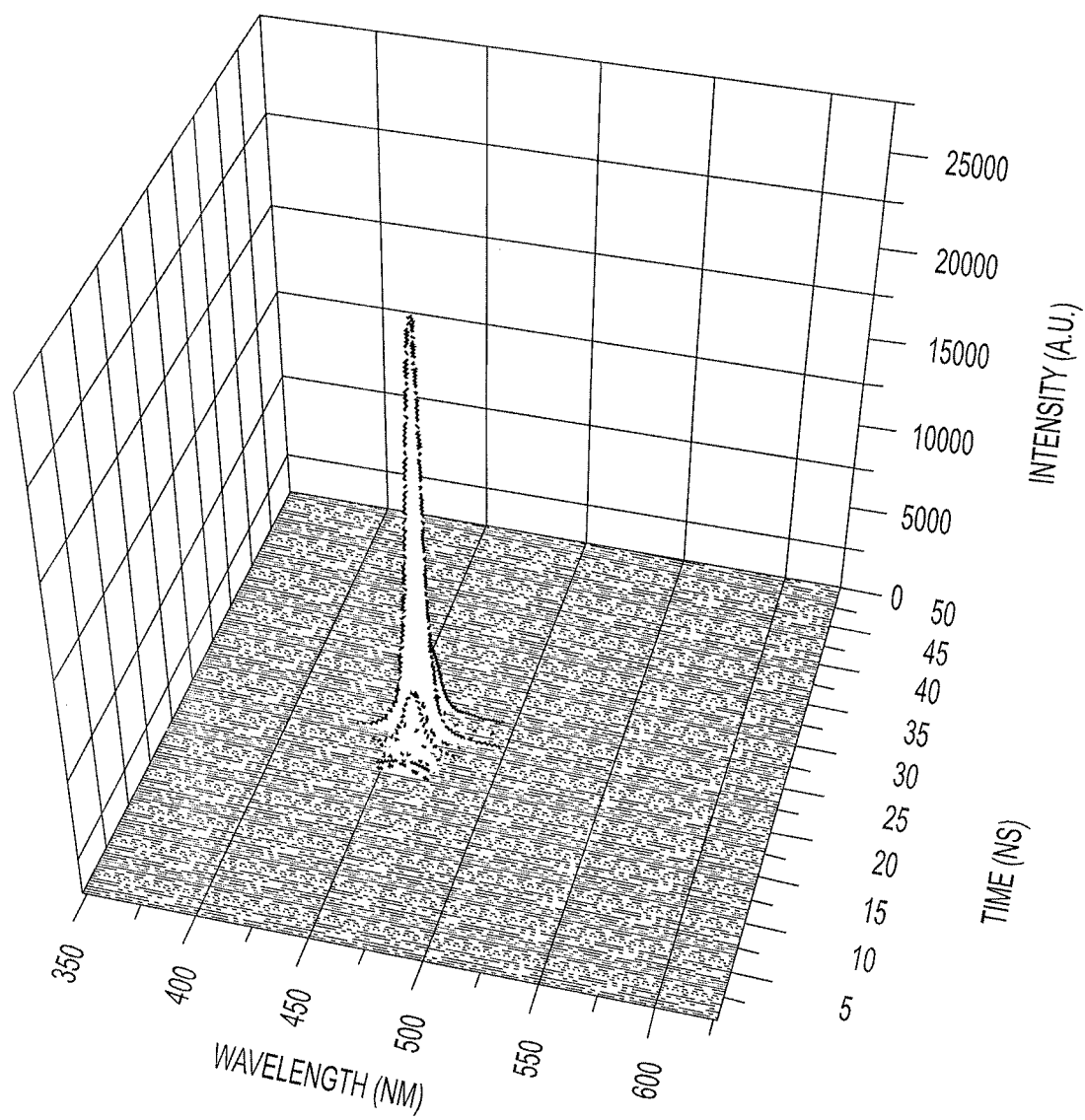
FIG. 7 is a plot of TRS results of ASE of an alternative embodiment of lasing medium used in the solid state laser with conjugated oligomer active material of FIG. 1, operating in the mirrorless mode, the lasing medium including the conjugated oligomer embedded in an ethylene-vinyl acetate (EVA) resin matrix, but omitting the thermally conductive material.

FIG. 7 shows the TRS of the ASE of the lasing medium of Example 4 for the mirrorless mode of laser 10 of FIG. 1. The FWHM is 3.5 nm. The laser using the lasing medium of Example 4 and Example 6, as will be described below, was found to be extremely stable, with a durability of $10^5$ shots.

Example 5

Conjugated Oligomer with $MoS_2$ in EVA Matrix

BECVH-DHF was dissolved in toluene (or other suitable solvents) to form solutions having different concentrations. For example, 4 mg of BECVH-DHF was dissolved in 2 ml of toluene. Between 5% and 15% of exfoliated $MoS_2$ single layer flakes was dispersed in the solution. Ethylene-vinyl acetate (EVA) beads were dissolved homogeneously in the same solvent to form a second solution. Alternatively, glue sticks were melted with a glue gun and the hot melt was added directly to the solvent. The BECVH-DHF solution was added to the EVA solution and maintained at 100° C. under stirring and sonication for three hours. A viscous liquid formed, and this was further sonicated without stirring for 20 minutes to remove air bubbles. The viscous liquid was then transferred to silicon molds (or quartz containers) of differing shapes, and left for 24 hours at room temperature. The solid lasing medium was then removed from the silicon molds (or quartz containers).

Example 6

Conjugated Oligomer with PCBM in EVA Matrix

BECVH-DHF was dissolved in toluene (or other suitable solvents) to form solutions having different concentrations. For example, 4 mg of BECVH-DHF was dissolved in 2 ml of toluene. Between 5% and 15% of single layer PCBM 60 was dispersed in the solution. Ethylene-vinyl acetate (EVA) beads were dissolved homogeneously in the same solvent to form a second solution. Alternatively, glue sticks were melted with a glue gun and the hot melt was added directly to the solvent. The BECVH-DHF solution was added to the EVA solution and maintained at 100° C. under stirring and sonication for three hours. A viscous liquid formed, and this was further sonicated without stirring for 20 minutes to remove air bubbles. The viscous liquid was then transferred to silicon molds (or quartz containers) of differing shapes, and left for 24 hours at room temperature. The solid lasing medium was then removed from the silicon molds (or quartz containers).

Example 7

Conjugated Oligomer in Acrylic Glue Matrix; No Thermally Conductive Material For purposes of comparison, Example 7 was prepared without a thermally conductive material. BECVH-DHF was dissolved in toluene (or other suitable solvents) to form solutions having different concentrations. For example, 4 mg of BECVH-DHF was dissolved in 2 ml of toluene. Acrylic glue (silicone gel) was injected into the same solvent to form a second solution. The BECVH-DHF solution was added to the acrylic solution and maintained at 70° C. (or, alternatively, at room temperature) under stirring and sonication for three hours. A viscous liquid formed, and this was further sonicated without stirring for 20 minutes to remove air bubbles. The viscous liquid was then transferred to silicon molds (or quartz containers) of differing shapes, and left for 24 hours at room temperature. The solid lasing medium was then removed from the silicon molds (or quartz containers).

Example 8

Conjugated Oligomer with $MoS_2$ in Acrylic Glue Matrix

BECVH-DHF was dissolved in toluene (or other suitable solvents) to form solutions having different concentrations. For example, 4 mg of BECVH-DHF was dissolved in 2 ml of toluene. Between 5% and 15% of exfoliated $MoS_2$ single layer flakes was dispersed in the solution. Acrylic glue (silicone gel) was injected into the same solvent to form a second solution. The BECVH-DHF solution was added to the acrylic solution and maintained at 70° C. (or, alternatively, at room temperature) under stirring and sonication for three hours. A viscous liquid formed, and this was further sonicated without stirring for 20 minutes to remove air bubbles. The viscous liquid was then transferred to silicon molds (or quartz containers) of differing shapes, and left for 24 hours at room temperature. The solid lasing medium was then removed from the silicon molds (or quartz containers).

Example 9

Conjugated Oligomer with PCBM in Acrylic Glue Matrix

BECVH-DHF was dissolved in toluene (or other suitable solvents) to form solutions having different concentrations. For example, 4 mg of BECVH-DHF was dissolved in 2 ml of toluene. Between 5% and 15% of single layer PCBM 60 was dispersed in the solution. Acrylic glue (silicone gel) was injected into the same solvent to form a second solution. The BECVH-DHF solution was added to the acrylic solution and maintained at 70° C. (or, alternatively, at room temperature) under stirring and sonication for three hours. A viscous liquid formed, and this was further sonicated without stirring for 20 minutes to remove air bubbles. The viscous liquid was then transferred to silicon molds (or quartz containers) of differing shapes, and left for 24 hours at room temperature. The solid lasing medium was then removed from the silicon molds (or quartz containers).

Example 10

Conjugated Oligomer Thin Film; No Thermally Conductive Material

BECVH-DHF was dissolved in toluene (or other suitable solvents) to form solutions having different concentrations. For example, 4 mg of BECVH-DHF was dissolved in 2 ml of toluene. The solution was spin-coated on glass, quartz or a transparent plastic substrate at speeds ranging between 400 rpm and 4000 rpm.

Figure 8:
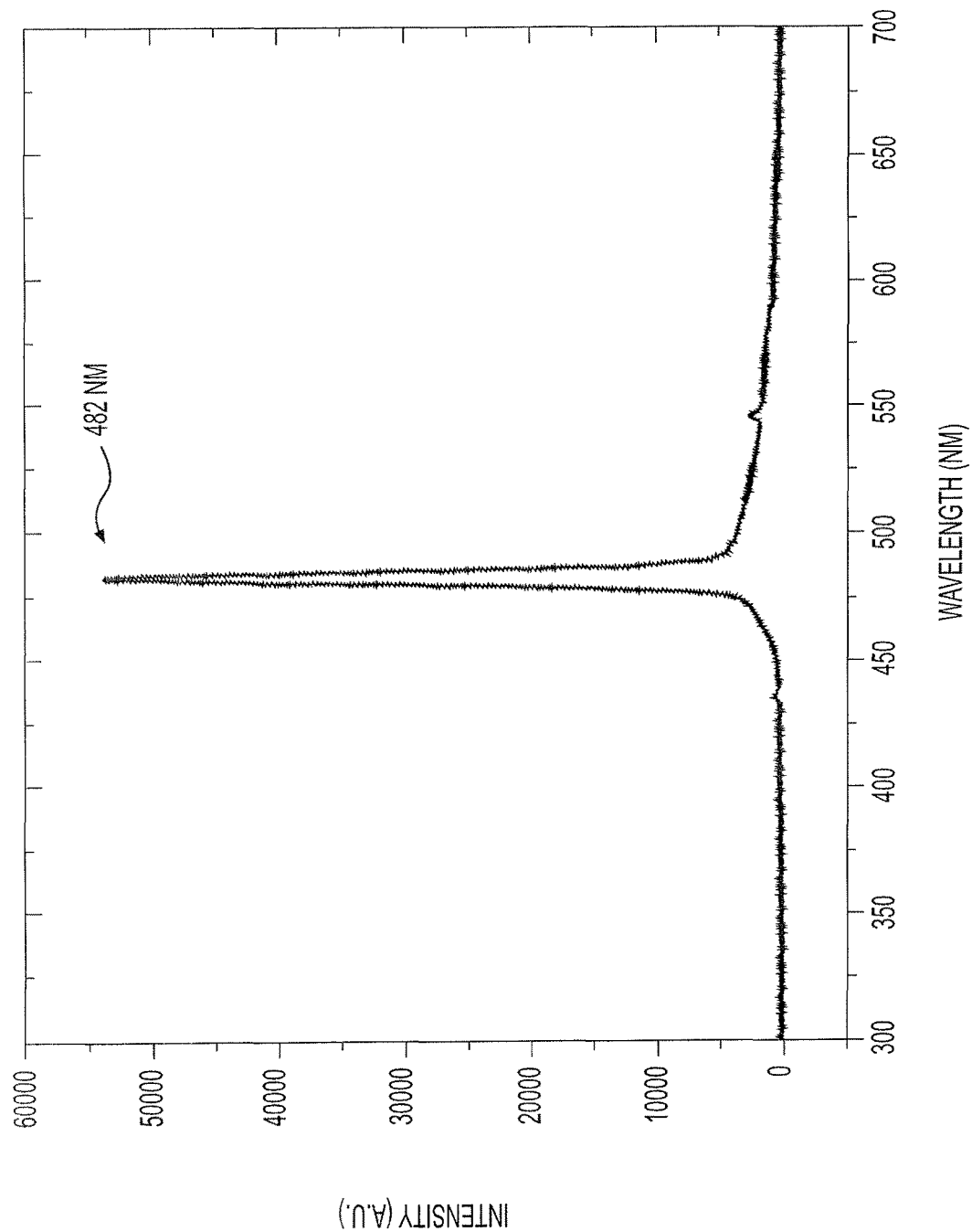
FIG. 8 is the ASE spectra of a thin film of lasing medium (see FIG. 3) used in the solid state laser with conjugated oligomer active material of FIG. 1, operating in the mirrorless mode, the lasing medium including the conjugated oligomer embedded in an acrylic glue (commonly known as silicone gel) matrix, but omitting the thermally conductive material.

FIG. 8 shows the ASE spectra using the lasing medium of Example 10 in the mirrorless mode of laser 10 of FIG. 1. Here, the output ASE peak was around 482 nm. Example 10 showed poor stability, with a lifetime of only 200 shots. However, the output energy and lifetime drastically improved when $MoS_2$ was added as a thermally conductive material (described below in Example 11). The lifetime of Example 11 improved to 2,000 shots (LGM 3.2). However, when PCBM 60 was added to the heterojunction oligomer thin film, as in Example 12 below, the stability and lifetime of the thin film improved three times when compared to that of Example 10 (i.e., 600 shots).

Example 11

Conjugated Oligomer with $MoS_2$; Thin Film

BECVH-DHF was dissolved in toluene (or other suitable solvents) to form solutions having different concentrations. For example, 4 mg of BECVH-DHF was dissolved in 2 ml of toluene. Between 5% and 15% of exfoliated $MoS_2$ single layer flakes was dispersed in the solution. The solution was spin-coated on glass, quartz or a transparent plastic substrate at speeds ranging between 400 rpm and 4000 rpm.

Example 12

Conjugated Oligomer with PCBM; Thin Film

BECVH-DHF was dissolved in toluene (or other suitable solvents) to form solutions having different concentrations. For example, 4 mg of BECVH-DHF was dissolved in 2 ml of toluene. Between 5% and 15% of single layer PCBM 60 was dispersed in the solution. The solution was spin-coated on glass, quartz or a transparent plastic substrate at speeds ranging between 400 rpm and 4000 rpm.

It is to be understood that the solid state laser with conjugated oligomer active material is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A solid state laser with a conjugated oligomer active material, comprising:
   a lasing medium including a conjugated oligomer embedded in a transparent crystal matrix, the transparent crystal matrix being an epoxy thermosetting plastic, wherein the conjugated oligomer comprises 1,4-bis(9-ethyl-3-carbazo-vinylene)-9,9-dihexyl-fluorene, further wherein the epoxy thermosetting plastic comprises a hardener and an epoxy selected from the group consisting of isobornyl acrylate, ethyl 2-cyanoacrylate, ethyl 2-cyano-3,3-bis(methylthio)acrylate, ethyl cyanoacrylate, ethyl cis-(β-cyano)acrylate, poly(bisphenol A-co-epichlorohydrin) and bisphenol A; and
   a pump laser configured for generating a pump laser beam to impinge on the lasing medium, the lasing medium generating at least one amplified spontaneous emission laser beam upon being impinged by the pump laser beam.

2. The solid state laser as recited in claim 1, further comprising a mirror, wherein the at least one amplified spontaneous emission laser beam comprises first and second amplified spontaneous emission laser beams, the first amplified spontaneous emission laser beam being reflected by the mirror back into the lasing medium.

3. The solid state laser as recited in claim 1, further comprising a thermally conductive material embedded in the transparent crystal matrix.

4. The solid state laser as recited in claim 3, wherein the thermally conductive material comprises molybdenum disulfide.

5. The solid state laser as recited in claim 3, wherein the thermally conductive material comprises [6,6]-phenyl-C61-butyric acid methyl ester (PCBM).

6. A solid state laser with a conjugated oligomer active material, comprising:
  a lasing medium including a conjugated oligomer embedded in a transparent crystal matrix, the transparent crystal matrix being an epoxy thermosetting plastic, wherein the conjugated oligomer comprises 1,4-bis(9-ethyl-3-carbazo-vinylene)-9,9-dihexyl-fluorene, further wherein the epoxy thermosetting plastic comprises a hardener and an epoxy selected from the group consisting of isobornyl acrylate, ethyl 2-cyanoacrylate, ethyl 2-cyano-3,3-bis(methylthio)acrylate, ethyl cyanoacrylate, ethyl cis-(β-cyano)acrylate, poly(bisphenol A-co-epichlorohydrin) and bisphenol A;
  a pump laser configured for generating a pump laser beam to impinge on the lasing medium, the lasing medium generating first and second amplified beams upon impingement by the pump laser beam;
  a fully reflective mirror configured for reflecting the first amplified beam back into the lasing medium; and
  a partially reflective mirror configured for partially reflecting the second amplified beam back into the lasing medium, the fully reflective mirror and the partially reflective mirror defining a laser cavity, a portion of the second amplified beam being transmitted through the partially reflective mirror.

7. The solid state laser as recited in claim 6, further comprising a thermally conductive material embedded in the transparent crystal matrix.

8. The solid state laser with a conjugated oligomer active material as recited in claim 7, wherein the thermally conductive material comprises molybdenum disulfide.

9. The solid state laser with a conjugated oligomer active material as recited in claim 7, wherein the thermally conductive material comprises [6,6]-phenyl-C61-butyric acid methyl ester (PCBM).

\* \* \* \* \*